(12) United States Patent
Morovic et al.

(10) Patent No.: US 9,626,607 B2
(45) Date of Patent: Apr. 18, 2017

(54) SPECTRAL PRINT MAPPING

(71) Applicant: Hewlett-Packard Development Company, L.P., Houston, TX (US)

(72) Inventors: Peter Morovic, Sant Cugat del Valles (ES); Jan Morovic, Colchester (GB)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/780,772

(22) PCT Filed: Apr. 22, 2013

(86) PCT No.: PCT/EP2013/058329
§ 371 (c)(1),
(2) Date: Sep. 28, 2015

(87) PCT Pub. No.: WO2014/173435
PCT Pub. Date: Oct. 30, 2014

(65) Prior Publication Data
US 2016/0155032 A1    Jun. 2, 2016

(51) Int. Cl.
*H04N 1/405* (2006.01)
*H04N 1/60* (2006.01)
(Continued)

(52) U.S. Cl.
CPC ....... *G06K 15/1878* (2013.01); *G06K 15/027* (2013.01); *G06T 5/00* (2013.01); *H04N 1/00954* (2013.01); *H04N 1/4072* (2013.01); *H04N 1/605* (2013.01); *H04N 1/6025* (2013.01); *H04N 1/6058* (2013.01); *G06T 2207/10024* (2013.01); *G06T 2207/30176* (2013.01); *H04N 2201/0082* (2013.01)

(58) Field of Classification Search
None
See application file for complete search history.

(56) References Cited

U.S. PATENT DOCUMENTS 7,710,597 B2    5/2010   Edge
8,335,015 B2   12/2012   Klassen et al.
(Continued)

FOREIGN PATENT DOCUMENTS

JP          2009164709        7/2009

OTHER PUBLICATIONS

Chen, Y et al. "Six color printer characterization using an optimized cellular Yule-Nielsen spectral Neugebauer model". Journal of Imaging Science and Technology, SPIE—The International Society for Optical Engineering, US, vol. 48, No. 6, Dec. 1, 2004.
(Continued)

*Primary Examiner* — Dov Popovici
(74) *Attorney, Agent, or Firm* — HP Inc. - Patent Department

(57) ABSTRACT

Spectral characteristics for printing fluids are obtained. Reflectance values for computing a gamut in spectral space are determined. A tessellation of the gamut is performed. The gamut provides a mapping of reflectance to Neugebauer Primary area coverages for a printing device. The printing device can print an image using the Neugebauer Primary area coverages.

13 Claims, 12 Drawing Sheets

(51) Int. Cl.
  *G06K 15/02* (2006.01)
  *G06T 5/00* (2006.01)
  *H04N 1/00* (2006.01)
  *H04N 1/407* (2006.01)

(56) References Cited

U.S. PATENT DOCUMENTS

| | | |
|---|---|---|
| 8,395,831 B2 | 3/2013 | Qiao |
| 2005/0062992 A1 | 3/2005 | Kishimoto et al. |
| 2009/0185200 A1 | 7/2009 | Tin |
| 2009/0237757 A1 | 9/2009 | Sawada et al. |
| 2010/0134550 A1 | 6/2010 | Ito et al. |
| 2011/0063632 A1 | 3/2011 | Klassen et al. |
| 2011/0069334 A1 | 3/2011 | Hoshii et al. |
| 2011/0096344 A1 | 4/2011 | Morovic et al. |
| 2012/0043751 A1* | 2/2012 | Hersch .................. B41M 3/144 283/92 |
| 2012/0113440 A1 | 5/2012 | Gil et al. |
| 2012/0147392 A1 | 6/2012 | Imai |
| 2012/0162239 A1 | 6/2012 | Marcu et al. |

OTHER PUBLICATIONS

International Search Report, Jan. 14, 2014, PCT Patent Application No. PCT/EP2013/058329, 3 pages.

International Search Report, Jan. 30, 2014, PCT Patent Application No. PCT/EP2013/072735, 4 pages.

Gerhardt, et al.: "Controlling the error in spectra vector error diffusion", Proceedings of SPIE, vol. 6493, Jan. 28, 2007, p. 649316.

McElvain, J. et al., Spectral Printer Modeling for Transparency Media: Toward High Dynamic Range Scene Reproduction, Jan. 19, 2009.

Morovic, et al.: "HANS: Controlling Ink-Jet Print Attributes Via Neugebauer Primary Area Coverages", IEEE Transactions on Image Processing, IEEE Service Center, Piscataway, NJ, US, vol. 21, No. 2, Feb. 1, 2012, pp. 688-696.

Stone, M.C. et al, Color Gamut Mapping and the Printing of Digital Color Images, Oct. 1988, pp. 242-292, vol. 7, No. 4.

Wyble, D.R. et al., A Critical Review of Spectral Models Applied to Binary Color Printing, Feb. 2000, pp. 4-19, vol. 25, No. 1.

* cited by examiner

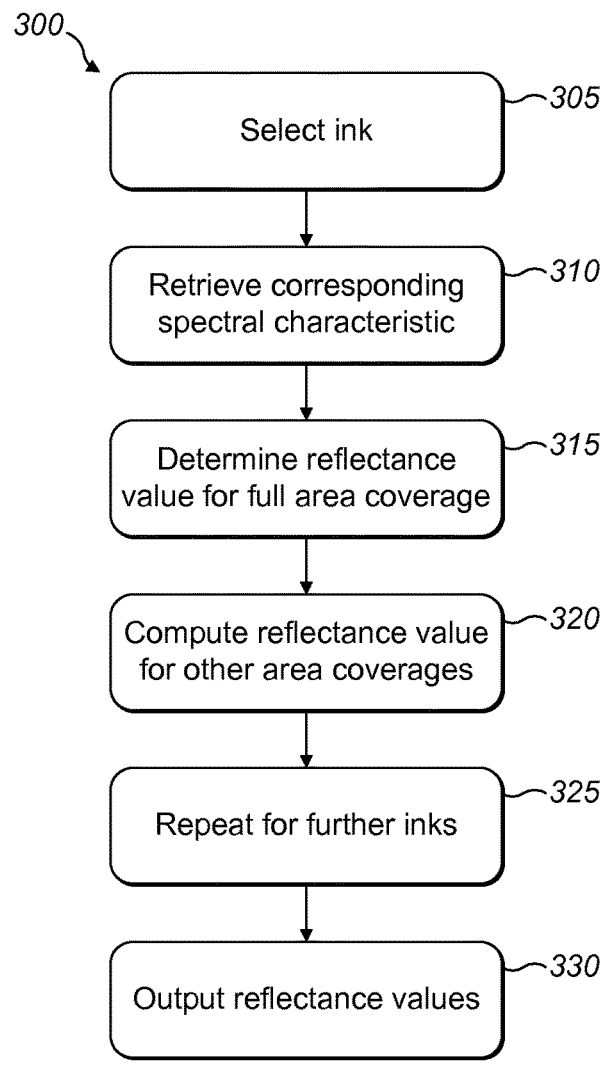

SPECTRAL PRINT MAPPING

CROSS-REFERENCE TO RELATED APPLICATION

This application is a U.S. National Stage Application of and claims priority to International Patent Application No. PCT/EP2013/058329, filed on Apr. 22, 2013, and entitled "SPECTRAL PRINT MAPPING," which is hereby incorporated by reference in its entirety.

BACKGROUND

Traditional printing uses a colorimetric approach to visually match a printed color to a color of source content. Colorimetry approximates human color perception by representing observed colors by their tristimulus values—one for each of the three types of light sensitive cells (cones) lining the retina at the back of the human eye. One type of cone cell is sensitive mostly to long wavelengths (L), another to medium wavelengths (M) and yet another to short wavelengths (S) of electromagnetic radiation in the visible range (i.e., from approximately 400 to 700 nm). Mostly for historical reasons, colorimetry uses a linear transformation of the LMS space, derived from psychophysical color matching experiments, called XYZ, defined by the CIE (Commission Internationale de l'Eclairage). The tristimulus values of X, Y and Z of a colorimetric approach form the basis of approximately representing all colors seen by a human visual system. Colors are thus identified based on co-ordinates in this CIE XYZ space.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 2E is a schematic illustration showing an example output of spectral characteristics for inks;

FIG. 3A is a flow chart that shows a method for obtaining reflectance values according to an example;

DETAILED DESCRIPTION

Figure 1A:
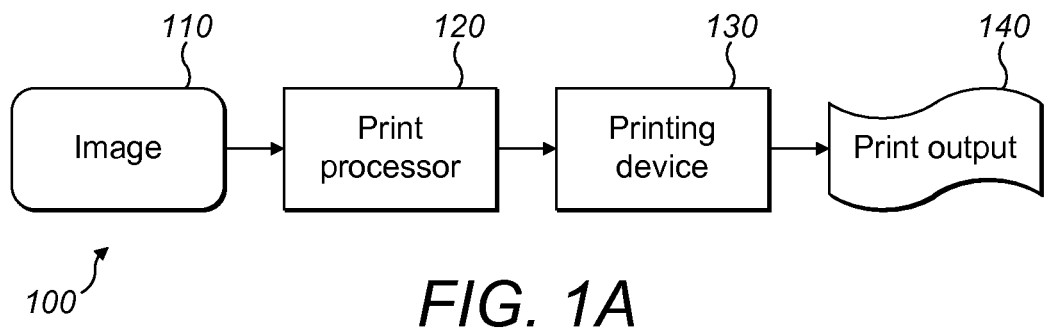
FIG. 1A is a schematic illustration showing a printing system for producing a print output.

In the following description, for purposes of explanation, numerous specific details are set forth in order to provide a thorough understanding of the present apparatus and method. It will be apparent, however, to one skilled in the art that the present apparatus and methods may be practiced without these specific details. Reference in the specification to "an example" or similar language means that a particular feature, structure, or characteristic described in connection with the example is included in at least that one example, but not necessarily in other examples.

Certain examples described herein may be used with inkjet and other types of printer to provide an ability to match properties of one or more printed reproductions with an original. Certain examples may also be used with Liquid Electrophotographic (LEP) printers, such as the Indigo range of printers supplied by Hewlett Packard Company of Palo Alto, Calif. Even though the term 'ink' is used for explanatory purposes in the description, the examples described herein may be applied to any 'printing fluid'. For example, printing fluids may be used that may or may not contain color pigmentation; in the latter cases, the printing fluid may alter an appearance of a printed output without color pigmentation, e.g. through the application of gloss or the like.

In certain printing systems and methods it may be desired to improve or maintain consistency of a visual match between a reproduction and an original. For example, a sufficiently close visual match between a printer output that uses cyan, magenta, yellow and black (CMYK) inks and an output obtained using another printer's inks may be desired. Alternatively it may be desired to visually match a print reproduction to an original painting. For example, it may be desired that the reproduction leads to the same viewing experience as the original painting. In certain cases it may be desired to match visual properties of particular materials, such as fabrics or plastics. For example, it may be desired that a picture of item of furniture in a catalogue is representative of an actual appearance.

Colorimetric reproduction, for example using the CIE XYZ color space, is generally limited to a set of viewing conditions such as a standard observer and a single illuminant. A standard observer is one that represents the average human's response to light falling on the receptors of the eye. Illumination conditions may change depending on the time of day for which observation is taking place, for example sunset gives rise to an illuminant of lower Correlated Color Temperature (CCT) falling on objects as opposed to an illuminant of higher CCT at midday. Therefore, a surface viewed under one illuminant will not necessarily give the same observed color when viewed under a second illuminant. Both the standard observer and illuminant are important considerations for color reproduction and for performing visual matching. Traditionally, the standard observer and standard illuminant (e.g. D50) are used to visually match colors observed between an original and a reproduction. However, when the observer or the illumination conditions are changed, the reproduction may no longer be accurate and appear different to the original.

Changes in illumination conditions cause effects such as metamerism and color inconstancy. Metamerism manifests when both an original (e.g. a painting) and its reproduction are viewed under different illumination conditions. In this case surfaces that matched under reference illumination conditions may no longer match. This leads to a degradation of the accuracy of the reproduction. Similarly, color inconstancy manifests when colors in a reproduction appear to differ from the color of an original when viewed under different illumination conditions. In certain cases of color inconstancy, colors may exhibit a certain cast in a reproduction. For example, some colors may appear more reddish than an original because the original uses other colorants (e.g., pigments) than the reproduction, which have different underlying reflectances. The term reflectance is used in this context to refer to the proportion of light that is reflected from an object. An example may include a recorded spectrum, such as a spectrum indicating a proportion corresponding to a plurality of detectors at number of sampled wavelengths. As such reflectance may be a relative measure that is independent of a light source. A reflectance value may be measured as a relative value, a factor, a percentage of the amount of reflection compared to the incident radiation, or have units of amplitude, or intensity, per unit area squared. For example, a reflectance value may comprise the number of photon counts falling on a photon detector at a particular wavelength, relative to the number of photons emitted at that wavelength.

The effect of metamerism is observed because there may be more than one combination of light across all wavelengths that can be used to produce an equivalent receptor response in the human eye. To match an apparent color, the origin of which is a given spectrum, an alternative spectrum (i.e. a metamer) can be used which has different spectral characteristics under the same illumination conditions. Therefore, under a given illuminant and for a given observer, a visual color matching between an original and reproduction can be achieved but this is still dependent on the underlying reflectances of the colors in the printed reproduction and the original. Metamerism is the existence of a multitude of combinations of reflectance properties that result in the same perceived color, as for a fixed illuminant and observer. However, when the illumination conditions and/or observer are changed, the metamer and apparent color may no longer be observed as the same and the perceived colors no longer match.

Colorimetries as discussed above are tied to specific illumination conditions and observers. Certain examples described herein achieve matches between an original image and a reproduction, wherein the perceived color of a reproduction remains substantially the same as that of the original under varying illumination conditions. This is achieved in certain implementations by controlling a print operation in a spectral domain to match surface reflectance properties. This results in a printed output that is not dependent on a specific observer or illumination condition. An ability to control a print operation in a domain of spectral reflectance properties, for example instead of CIE XYZ values, has a benefit of a reproduction that matches an original in both illuminant and observer independent ways. This in turn results in a visual match even when illuminants, observers or both have changed. For example, a printed output being a spectral match to its corresponding original would match the original whether viewed at midday or viewed at sunset.

Certain examples described herein enable visual matching that is less dependent on the observer and illumination conditions. For example, these examples enable color mixing using the spectral properties of a color based on input reflectance characteristics. Certain example methods are described that configure a printing pipeline that is spectral in nature throughout and therefore allows for control of visual matching for different viewing conditions or a direct matching of spectral characteristics. In certain cases, matching of spectral characteristics may be independent of a particular color; for example it may be applied in grayscale systems or based on a gloss appearance. In this sense, "spectral" may refer to properties that represent a variation of power, amplitude or intensity with wavelength or frequency. A reflectance property may represent power, amplitude or intensity at a single wavelength, or a range of wavelengths, representing light reflected from a given object for which the reflectance property is obtained. A reflectance value may be measured as described previously. Example properties may include the proportion of light, radiant flux, optical return loss or radiation incident on a surface that is reflected from the surface. Reflectance properties provide information corresponding to an observed material and/or object and can be measured using many different approaches, for example using a reflectometer, spectrometer, spectrophotometer, photometer, monochromator, interferometry, filters, mirrors, gratings, beam splitters, amongst others. Optical equipment and/or computer analysis tools may also be used that interpret measurements or compensate for calibrations or other known properties specific to a measured surface (e.g. scattering effects).

A number of examples will now be described. These examples demonstrate how a spectral print mapping may be achieved.

FIG. 1A shows a printing system 100 that may be used with the methods described below. The printing system 100 may be used to produce a print output. The print output comprises colored inks deposited on a print medium. In the example of FIG. 1A, image data corresponding to an image 110 is sent to a print processor 120. The print processor 120 processes the image data. It then outputs print control data that is communicated to a printing device 130. The printing device generates a print output 140 as instructed by the print control data.

Figure 1B:
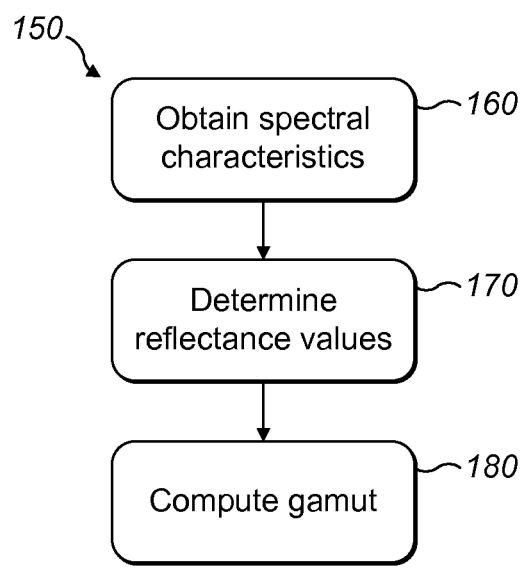
FIG. 1B is a flow chart that shows a method for print mapping.

FIG. 1B shows a method for configuring a print mapping according to one example. This method may be implemented to configure the print processor 120 of FIG. 1A. At block 160 spectral characteristics for a plurality of printable inks are obtained. These inks may comprise the inks that are printable by printing device 130. At block 170 reflectance values for a plurality of printable inks are determined. These reflectance values are determined based on the obtained spectral characteristics. At block 180 a spectral gamut is computed using the reflectance values. The spectral gamut provides a representation of printable colors in spectral space, i.e. an N-dimensional space representing spectral properties where N corresponds to the number of spectral samples taken across the visible range such as 16 or 31 for a 400 nm to 700 nm range at 20 nm or 10 nm intervals respectively. The spectral gamut may be computed by applying limits representing the print characteristics of a particular printing device, for example printing device 130 of FIG. 1A.

In one implementation, the primary inks available to a printing device (i.e. the printable inks) may be for example, cyan, magenta and yellow (CMY). In this case the printing device is adapted to deposit these inks onto a printing medium. For example, in an ink jet implementation, ink may be supplied from one or more ink cartridges and deposited onto a print medium through the use of one or more nozzle actuators. In one example, spectral characteristics may comprise a surface reflectivity from an object, or variation of a particular optical property depending on wavelength. In a case of an original image and a reproduction, the object may comprise the original image.

In examples described herein reflectance values are determined for combinations of primary inks known as the Neugebauer Primaries (NPs) For a binary (bi-level) printer, a Neugebauer Primary is one of $2^k$ combinations of k inks within the printing system, wherein ink concentrations are at 0% or 100% in an k-dimensional color space. For example, if a printing device uses CMY inks there can be eight NPs: C, M, Y, C+M overprinting (or blue), C+Y overprinting (or green), M+Y overprinting (or red), C+M+Y overprinting (or black), and W (or white or blank indicating an absence of ink). As is clear, a printing device with many primary inks and many ink-drop states can have more NPs available than a printing device with only a few primary inks and only bi-level states. As such at block 170 reflectance values for available NPs are determined.

FIGS. 2A to 2E show examples for obtaining spectral characteristics as described with reference to block 160 of FIG. 1B.

One implementation of block 160 uses an ink template. This may be associated with a particular printing device. Other implementations may obtain spectral characteristics without the use of an ink template. An ink template is related to the primary inks and therefore the NPs available.

Figure 2A:
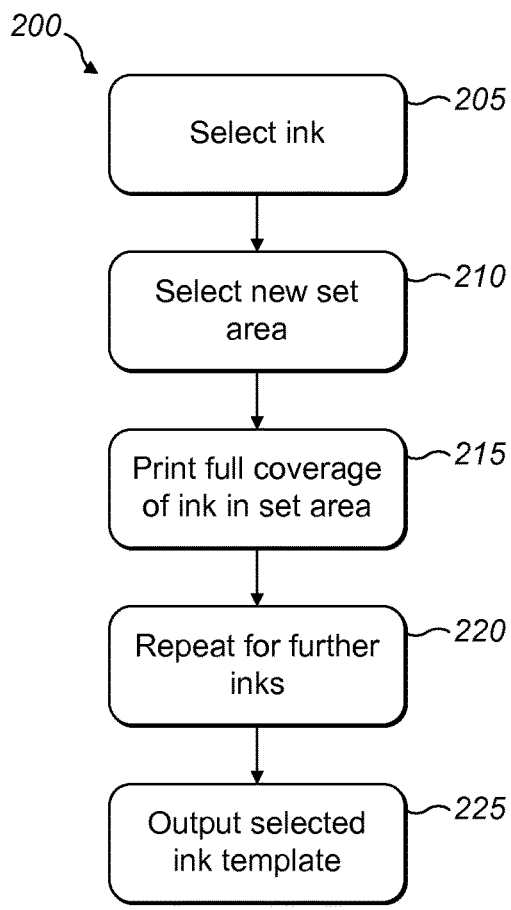
FIG. 2A is a flow chart that shows a method for obtaining an ink template according to an example.

An example of a method for obtaining an ink template for a printing device is given in FIG. 2A. In block 205 each NP is selected in turn. In this example, the printing device has CMY primary inks available giving rise to eight NPs. However, it is to be understood that a printing device may use many more primary inks, for example CcMmYK. At block 210 a set area within a template is selected. At block 215 a full coverage of inks representing a selected NP is printed within the selected set area of the template. Each set area can be equal within the same template for consistency in measurement areas. Once the first of the eight NPs in this example is printed, the process is repeated for each further NP at block 220 by printing each further NP in a new set area of the template. Once all NPs have been printed in their corresponding set areas, the ink template is output at block 225.

Obtaining a full coverage of the selected ink involves covering the entire set area selected with a layer of inks representing the selected NP. A different area coverage may be obtained by covering only a percentage less than 100% of a set area's pixels using the selected NP. It should be noted that varying area coverage can be used for scaling spectral characteristics which may be measured using a template. Spectral characteristics may be scaled to reflectance values accordingly.

Figure 2B:
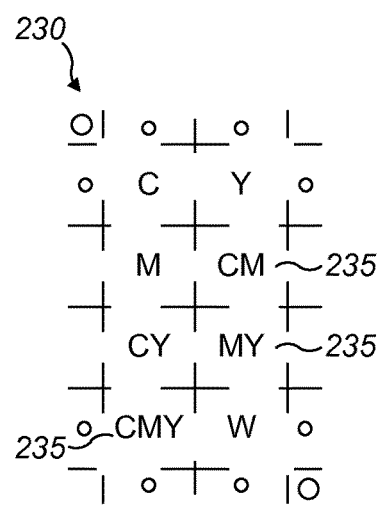
FIG. 2B is a schematic illustration showing an example of an ink template.

FIG. 2B shows an example output of an ink template 230 in which each NP has been printed in a set area 235. The ink template can be used for obtaining spectral characteristics for a given printing device or system. Once the ink template for a printing device has been produced, the ink template may be stored in a database for retrieval at a later time or fed directly into an image processing system.

Figure 2C:
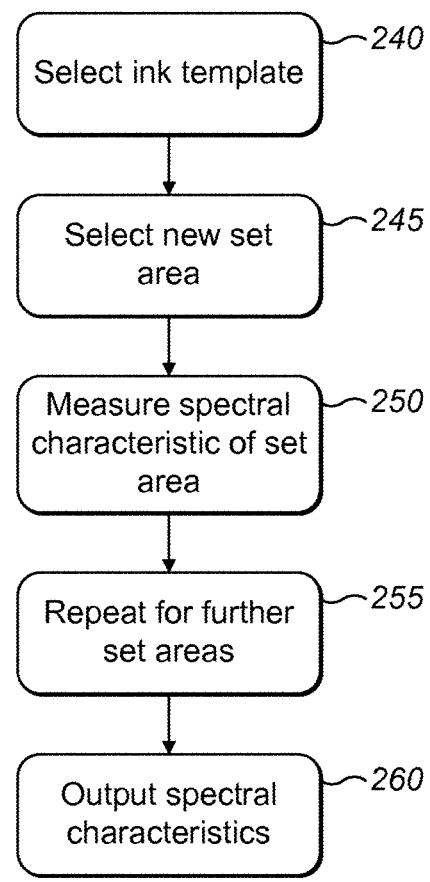
FIG. 2C is a flow chart that shows a method for obtaining spectral characteristics of inks according to an example.

FIG. 2C shows a method that may be used in one example for obtaining the spectral characteristics for a printing device. The ink template corresponding to the printing device is selected at block 240 and a set area (235) for taking spectral characteristic measurements is chosen at block 245. Any suitable device for measuring spectral characteristics may be used, for example a spectrometer or spectrophotometer, which may or may not be built-in with the printing system. The selected set area is then scanned between a predetermined range of wavelengths in a chosen number of steps. For example, a built-in spectrophotometer may be able to measure visible wavelengths, for example in the range 400 nm to 700 nm. Spectral characteristics may be obtained from a spectrum of a measured color. Measurements may be integrated across intervals of width D, such that the number of intervals, N, equals the spectral range divided by D. In one example, the spectral range may be 400 nm to 700 nm and D may be 20 nm, resulting in values for 16 intervals, i.e. N=16. D may be set based on the properties of a specific spectrophotometer and/or configured based on the specific requirements of each example. Each value may be a value of reflectance, e.g. measured intensity, for each set area. Once spectral characteristics of the first set area have been measured at block 250, the process is repeated for each further set area at block 255. Once the process has been repeated the required number of times the spectral characteristics can be output at block 260.

Figure 2D:
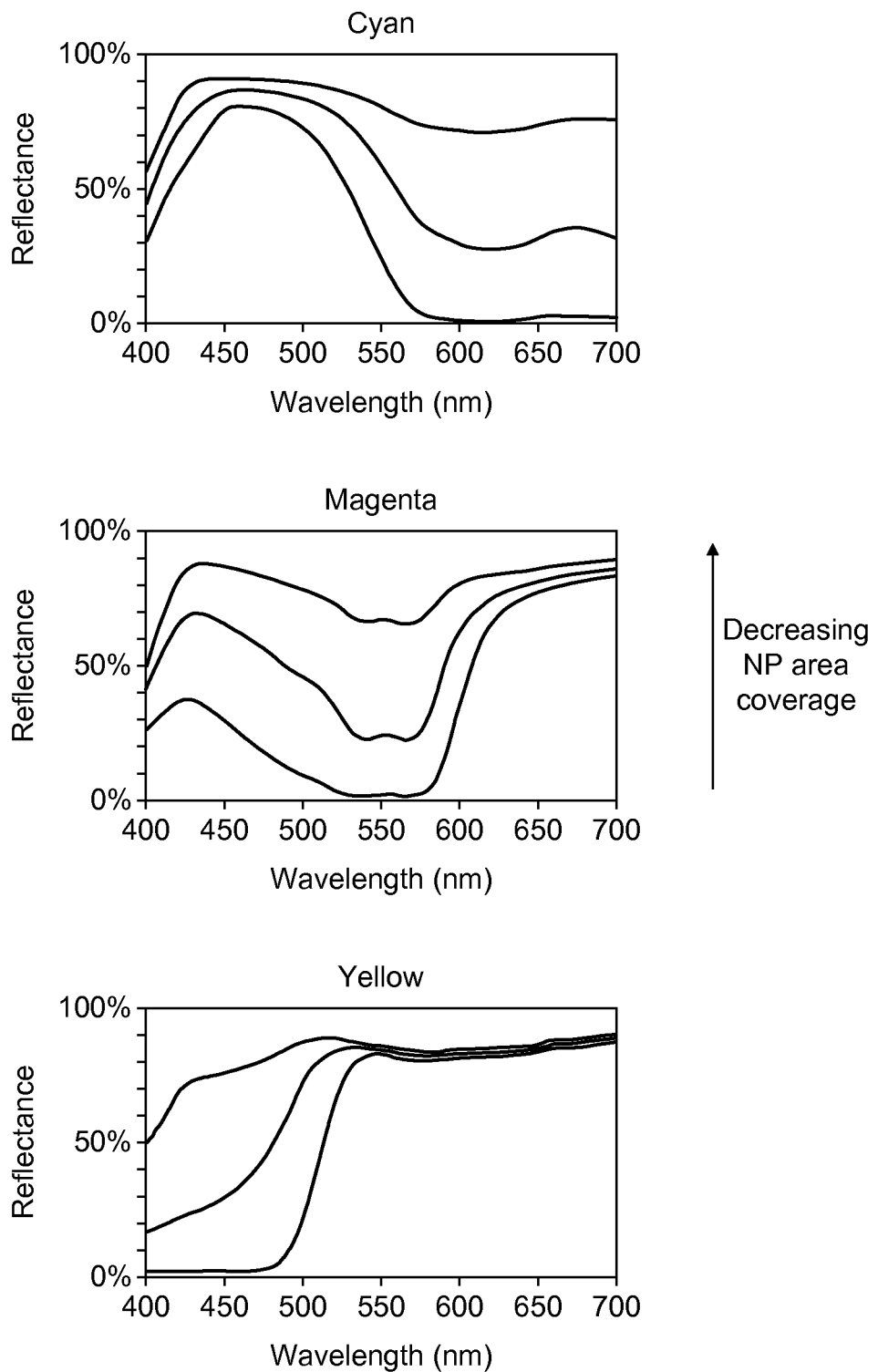
FIG. 2D is a schematic illustration showing examples of spectral characteristics for inks.

Spectral characteristics may include spectral properties of the printed inks such as the intensity of each wavelength measured for each NP and this can take the form of a spectrum of wavelengths in which each NP gives a different intensity response as shown in FIG. 2D. Example spectra for cyan, magenta and yellow are shown for which a decreasing NP area coverage corresponds to increasing values of reflectance. From the spectrum corresponding to full area coverage, the other NP area coverages may be scaled for less and less area coverage. This visual representation of spectral data may also be represented as a plurality of vectors where each value within the vector corresponds to the intensity at each wavelength interval in each set area measured as shown in FIG. 2E. In certain cases spectral properties may only be measured for primary inks. In this case spectral characteristics for NPs may be determined based on the spectral properties of the primary inks, e.g. using spectral modeling.

Although FIGS. 2A to 2E demonstrate one particular example of obtaining spectral characteristics other methods may be used. For example, information from the frequency domain may be used to define the color response and/or spectral color properties may be modeled based on known chemistry of ink pigments.

Figure 3B:
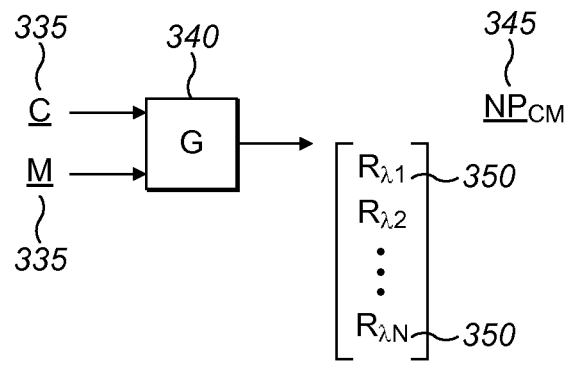
FIG. 3B is a schematic illustration showing a method for computing reflectance values according to an example.

FIGS. 3A to 3B show examples for obtaining reflectance values from obtained spectral characteristics. For example, this example may be used to implement block 170 in FIG. 1B.

FIG. 3A shows an example method 300 for obtaining reflectance values from spectral characteristics for a set of inks. At block 305 an ink is selected and data defining corresponding spectral characteristics is retrieved at block 310. This data is used to determine a reflectance value at block 315 for the full area coverage of a selected NP, e.g., using the reflectivity and opacity parameters characterizing an ink's mixing properties in the Kubelka-Munk model. Once the reflectance value for the full area coverage is calculated, the reflectance value for other area coverages can be computed at block 320. An example of this is given in FIG. 2D. This process is repeated for further inks at block 325 and the reflectance values for each NP outputted at block 330.

FIG. 3B shows an example method for computing the reflectance values for a set of NPs. In this example, spectral measurements for one or more primary inks 335 are input into a transfer function 340. The transfer function 340 computes the reflectance values of an NP 345 corresponding to the input primary inks 335. In this example, an ink has associated spectral characteristics that are described by a vector e.g. the spectral characteristics for cyan and magenta may be C and M respectively. The vector may have a length that is proportional to the number of wavelength intervals as described above. For example, the spectral characteristics for C and M could be used to determine or predict the reflectance characteristics for an NP consisting of cyan and magenta, i.e. $NP_{CM}$.

Although FIGS. 3A and 3B demonstrate one particular example of determining reflectance values other methods may be used. For example, a reflectance value for half-area coverage may be determined based on a reflectance value for full-area coverage. Additional information may be retrieved that relates the area coverage of the NP in the set area to its spectral characteristics measured. The additional information retrieved could be a mathematical or scaling function or table describing the response of the spectral characteristics measured and their relationship to the area coverage used.

FIGS. 4A to 4D show an example for computing a gamut as described with reference to block 180 of FIG. 1B.

Figure 4A:
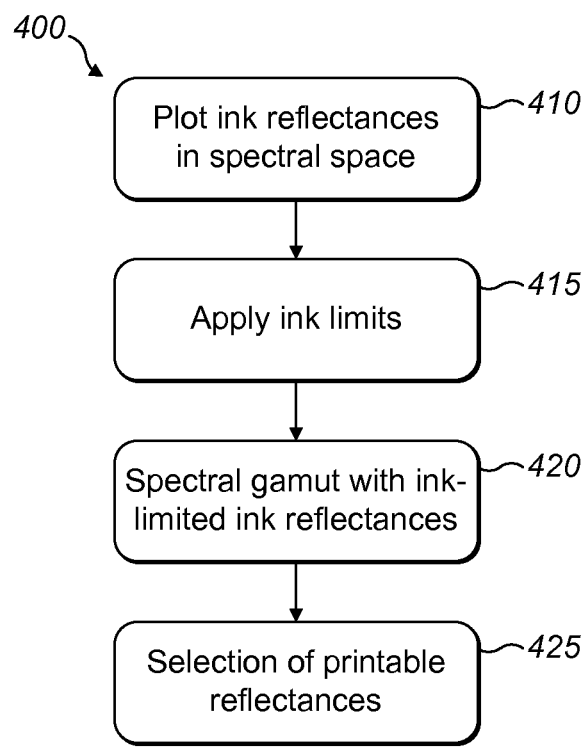
FIG. 4A is a flow chart that shows a method for obtaining a spectral gamut for printable inks according to an example.

Once the reflectance values are known, a spectral gamut for printable inks can be computed or generated as shown by the method 400 of FIG. 4A. In this example ink-limits are applied to one or more of the computed NP reflectance values. This restricts the gamut to the set of printable ink combinations. In other implementations ink limits may be determined at an earlier stage; for example, ink limits may be implicit when printing the ink template referred to in FIGS. 2A to 2E. In one case, ink associated with an NP is printed at the maximum area coverage permissible by an ink-limit. For example, a test portion may comprise 75% CM combined with 25% W to satisfy an ink-limit. These ink-limits are thus implicit in the measure spectra and the generated gamut.

Turning to the example of FIG. 4A, at block 410 a set of computed NP reflectance values are determined in an N-dimensional space referred to as spectral space. Spectral space is a mathematically-defined N-dimensional space in which each point in spectral space is defined by an N-dimensional co-ordinate. In this case each co-ordinate value is a reflectance value for a particular wavelength interval. Hence, a set of reflectance values for a particular NP represents a point in the N-dimensional space. Once reflectance values for a set of NPs have been determined, ink limits for a particular printing device are applied at block 415. This enables a spectral gamut with ink-limited ink reflectances to be generated as shown at block 420. This ink-limited gamut defines a set of printable reflectances that are selectable at block 425. In this example, ink limits may correspond to the number of drops per pixel that the printing device is capable of applying for each primary ink. For example, a printing device having only cyan and magenta primary inks may only be capable of printing four colors at individual halftone pixels which are cyan, magenta, blue (C+M) and white (blank substrate). In this case, the shade of blue that can be achieved can depend on how many pixels of a region below the resolving power of the human visual system are covered using each of the four available at-pixel colors.

Figure 4B:
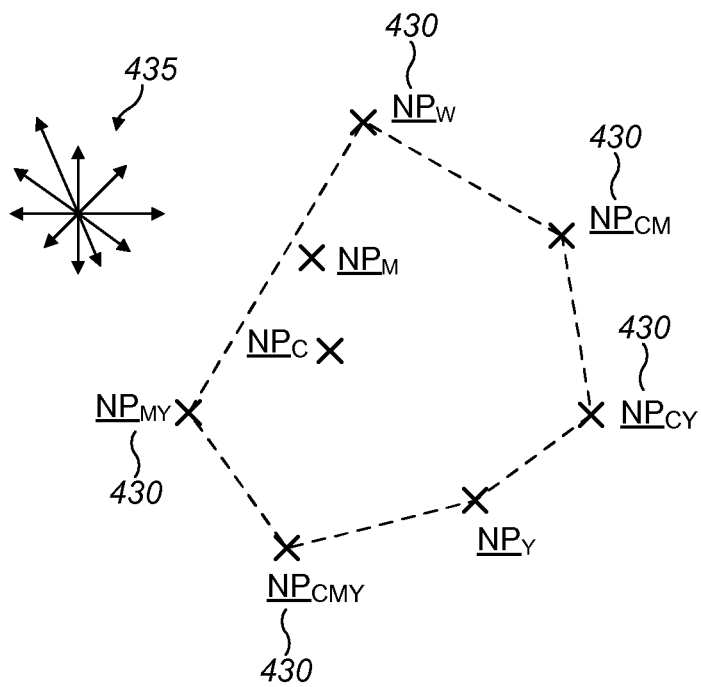
FIG. 4B is a schematic illustration showing a plot of Neugebauer Primary reflectances in N-dimensional spectral space according to an example.
Figure 4C:
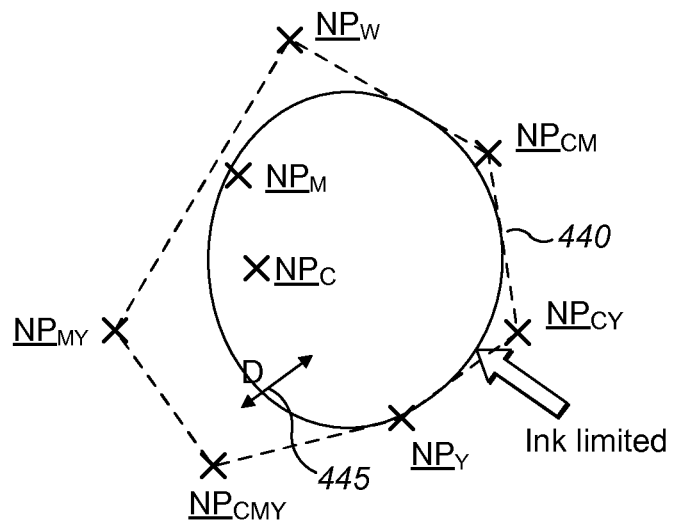
FIG. 4C is a schematic illustration showing a plot of Neugebauer Primary reflectances with applied ink limits according to an example.

One example process of gamut limitation according to specific properties of a particular printing device will now be explained in more detail with reference to FIGS. 4B and 4C. FIG. 4B shows a plot of NP reflectances 430 in an N-dimensional 435 spectral space in which each NP reflectance is a point in the plot. In this case the space between reflectances can be interpolated to obtain any reflectance enclosed by their convex hull, since each point within that hull is a convex combination of some of the NPs delimiting it. The plot of reflectances as shown in FIG. 4B represent a set of reflectances that may be achieved using a set of NPs. However, a subset of these reflectances may not actually be printable due to limitations of a printing device. For example, a subset of a gamut that is printable may depend on ink limits of the substrate onto which the printing device is to print. Once characteristics of a substrate are taken into account, this may cause a reduction in the number of reflectances that are printable. An example of the reflectances that are printable following adjustment is shown in FIG. 4C. For example, FIG. 4C may represent ink-limited NPs 440.

Figure 4D:
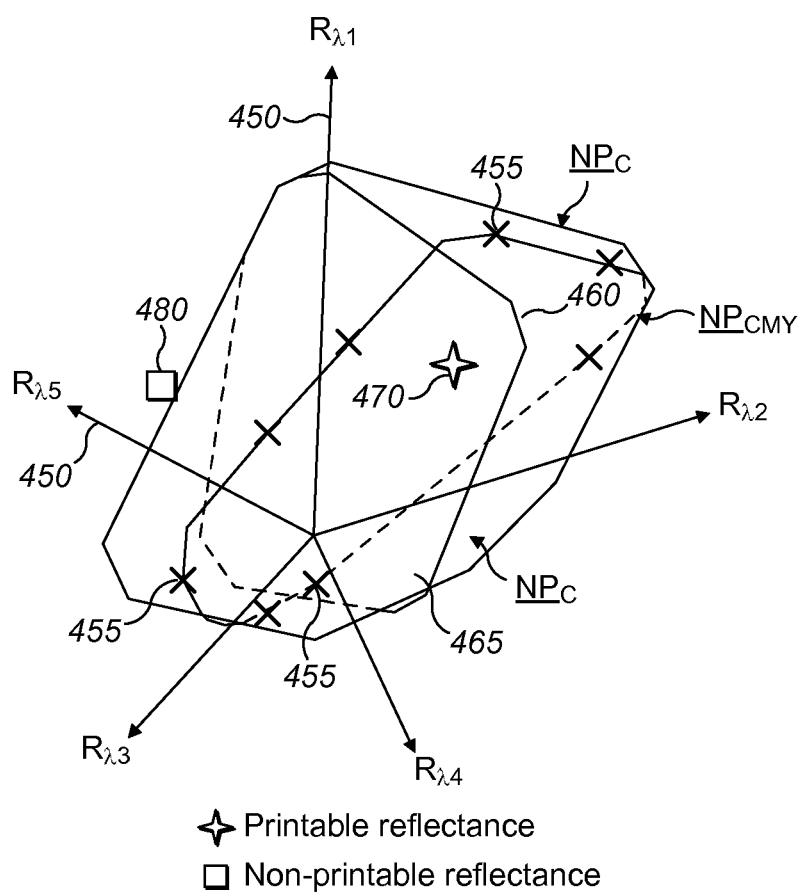
FIG. 4D is a schematic illustration showing a gamut in spectral space with ink-limited Neugebauer Primary reflectances according to an example.

FIG. 4D shows an illustration of a gamut in spectral space. The gamut shown in this example has ink limits applied to the reflectances, as discussed above. Different printing devices may have differing ink limits that determine the shape of the gamut in the N-dimensional spectral space. In FIG. 4D, each NP reflectance is determined in the spectral space according to the intensity of the reflectance value at each wavelength interval 450. In other examples other multi-dimensional representations may be used. The outermost surface connecting the NP reflectances 455, 460 is referred to as a convex hull. It may be generated by interpolating a plurality of ink-limited reflectance values. The ink-limited NP reflectances and the within ink-limit NP reflectances are used to produce the convex hull. Ink-limited NP reflectances may correspond to NP area coverages (NPacs) since an over-the-ink-limit NP is used at a less than 100% area coverage and combined with other within-ink-limit NPs, e.g. white (W). NPacs are described in more detail below. In any case the result is an accessible spectral gamut. The use of a convex hull of the spectral gamut offers a larger reflectance palette than use of a concave hull that often arises when a printing system is controlled in ink amount instead of NP area coverage terms. In certain examples, a gamut may be defined in a Yule-Nielsen-corrected spectral space (YNN). In this case the reflectance is raised per-wavelength according to a spectral Yule-Nielsen k factor, which accounts for optical dot-gain in a print. To match a given reflectance, it is first raised to the power of k and then compared with the reflectances of the within ink-limit NPs and NPacs, also raised to the same power of k to find the appropriate NPac that matches it. Performing this operation in a Yule-Nielsen modified reflectance space accounts at least a portion of the light scattering that takes place in a halftone print.

In the example of FIG. 4D, the gamut represents a subset of the spectral space that is available to the printing device for a particular device configuration and/or set of conditions. For example, the gamut may be defined for a printer using CMY inks and a set of ink limits for those colors. In FIG. 4D, any reflectance value falling within outermost surface 465 may be printed by the printing device and these are referred to as printable reflectances 470. As discussed below, a printing system may be capable of handling redundancies of printable reflectances. A redundancy is a metamer which may be obtained using different combinations or area coverages of the various NPs. Non-printable reflectances 480 are any points that fall outside of the outermost surface of the gamut 465.

Although FIGS. 4A to 4D demonstrate one particular example of computing a spectral gamut other methods may be used. For example, a full gamut may be obtained externally for all available printer inks and then reducing the gamut according to printer specific properties. In other examples the gamut may correspond to a greyscale gamut, such as for a neutral (greyscale) NPs.

A spectral gamut as described above may be used to provide a mapping of reflectance to an area coverage of a number of NPs. As described previously, these area coverages are referred to as NPacs. These are distributions of NPs over a unit area and serve as the input for the halftoning procedure. This may be seen as selecting one of the NPs at every halftone pixel. Note that there is a multitude of NPacs that correspond to any one ink-vector as used by comparative printing systems. Each of these NPacs however has a different combination of reflectance and colorimetry and therefore gives access to a much larger variety or printable gamut. For example, multiple NPacs may have the same colorimetry (being that colorimetry's metamers) while differing in spectral reflectance. There may also be multiple NPacs with the same reflectance but with different use of the available NPs.

In an example, tessellation may be used to define a gamut, such as the spectral gamut described above. Tessellation may be defined as the process of using a repetition of a geometric shape to fill an N-dimensional area or volume without overlap. In one example, performing tessellation on a convex hull defined for a gamut fills the convex hull with a plurality of polyhedra such that there are no overlaps or gaps. Since each point in spectral space relates to an NP reflectance spectrum, all polyhedra are formed using the NP reflectances. Once a gamut is tessellated, the tessellation may be used to map a reflectance to a print configuration for a print output. One example of this is described below.

Figure 5A:
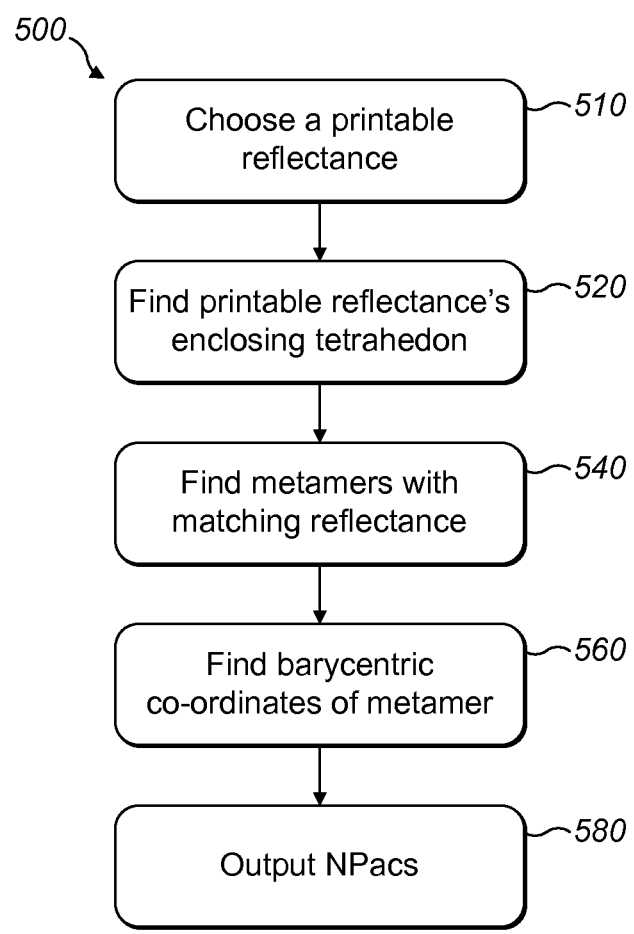
FIG. 5A is a flow chart that shows a method for mapping to Neugebauer Primary area coverages using tessellation according to an example.
Figure 5B:
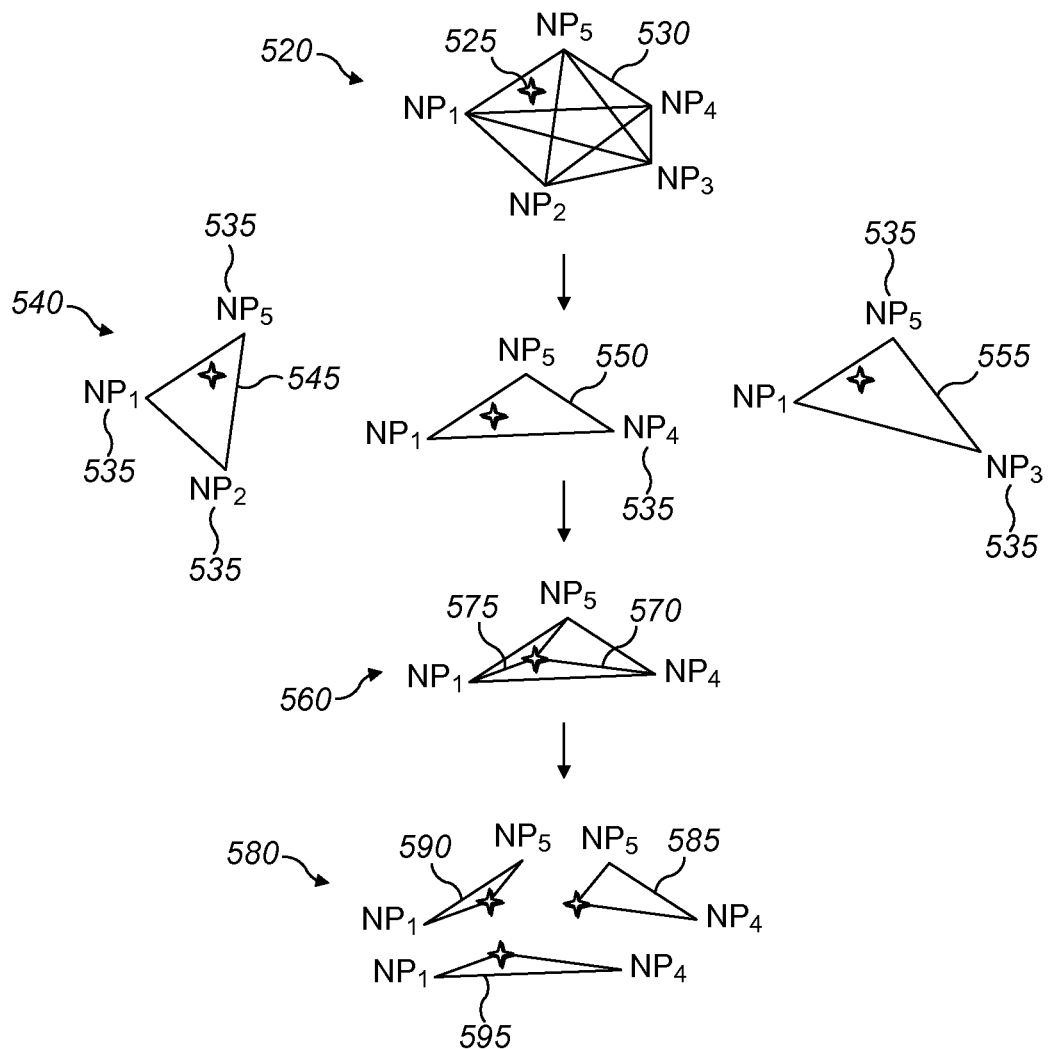
FIG. 5B is a schematic illustration showing a method for mapping to Neugebauer Primary area coverages according to an example.

FIGS. 5A to 5B show an exemplary implementation for performing a tessellation.

FIG. 5A shows an example method 500 for mapping reflectance values to NPacs. In this case, the tessellation (e.g. Delaunay) of the gamut in spectral space defines a spectral separation, i.e. a mapping from spectral to NPac space that may be printed by a printing device that is defined in spectral space.

The method of FIG. 5A begins at block 510. Here a reflectance, i.e. a point in the N-dimensional spectral space, is selected. At block 520 the selected reflectance's enclosing tetrahedron (or polyhedron with more vertices) is found. This gives the ability to obtain and select metamers with a matching reflectance at block 540 to the chosen printable reflectance. For a metamer, area co-ordinates, in this example barycentric co-ordinates, are used at block 560 to linearly map weighted functions of the metamer to output values for NPacs at block 580 that may be printed to achieve the selected reflectance. In certain examples the reflectance may be converted to the YNN spectral domain as a pre-processing step; for example, if the spectral space is defined in relation to said domain.

There may be more than one enclosing polyhedron for a reflectance if a redundancy exists to provide metamers for the reflectance. An example of this is shown in FIG. 5B. For a reflectance 525 the enclosing polyhedron 530 is found and from this polyhedron representing the metamers 545, 550, 555 are derived. In this case the NPs, as determined and potentially limited in the spectral space, are located at the vertices 535 of a metamer polyhedron. A metamer can be achieved using different combinations of the NPs, or NPacs, located at the vertices of the polyhedron. In the example of FIG. 5B, the metamers for the printable reflectance may be formed using $NP_1$ and $NP_5$ with different combinations of either $NP_2$, $NP_3$ or $NP_4$. However, in order to obtain an accurate metamer the amount of these NPs together i.e. the area coverage of an NP, must be derived and this can be achieved by computing the interpolation of weights. The interpolation of weights may also be referred to as weighting to interpolate the surface at points inside the triangle. A weight function varies from a value of zero at the printable reflectance 525 up to one for each vertex, at the locations of the vertices 535. The weights for a vertex are determined using area co-ordinates to describe the position of the point within the metamer polyhedron 545, 550, 555 relative to a vertex 535. These area co-ordinates are referred to as barycentric co-ordinates and they depend upon the polyhedron geometry. The barycentric co-ordinates of the chosen reflectance within the tessellation are computed and the above weights are applied to the NPs to obtain the corresponding NPacs of the vertices of the enclosing polyhedron. The relative magnitude 570, 575 of the barycentric co-ordinates correspond to the volume ratios of an NP within the polyhedron. Thus, for a printable reflectance within any polyhedron or metamer polyhedron the area coverage for an NP can be determined by directly mapping from the barycentric co-ordinates which correspond to the NPacs. Therefore a print mapping to NPacs is achieved using tessellation where the resulting NPacs correspond to the chosen reflectance.

Although FIGS. 5A to 5B demonstrate one particular example of mapping to NPacs other methods may be used. For example, a reflectance may be pre-processed to map it to a printable reflectance if it falls outside the printable gamut.

The above corresponds to a tessellation and tetrahedral interpolation in N-dimensions applied using N steps over a distance with step size D for the spectrophotometer measurements. However, other tessellations and/or interpolations may be preferred such as cubic tessellation or tri-linear interpolation for example, depending on predetermined accuracy criteria. The gamut mapping may also be performed in the spectral domain by means of minimum-distance mapping to the convex hull that defines the spectral gamut or other alternatives such as spectral or colorimetric distance co-minimization can be used, where the total mapping is the result of an initial color mapping stage followed by spectral mapping that no longer changes color under a chosen illuminant.

Figure 6:
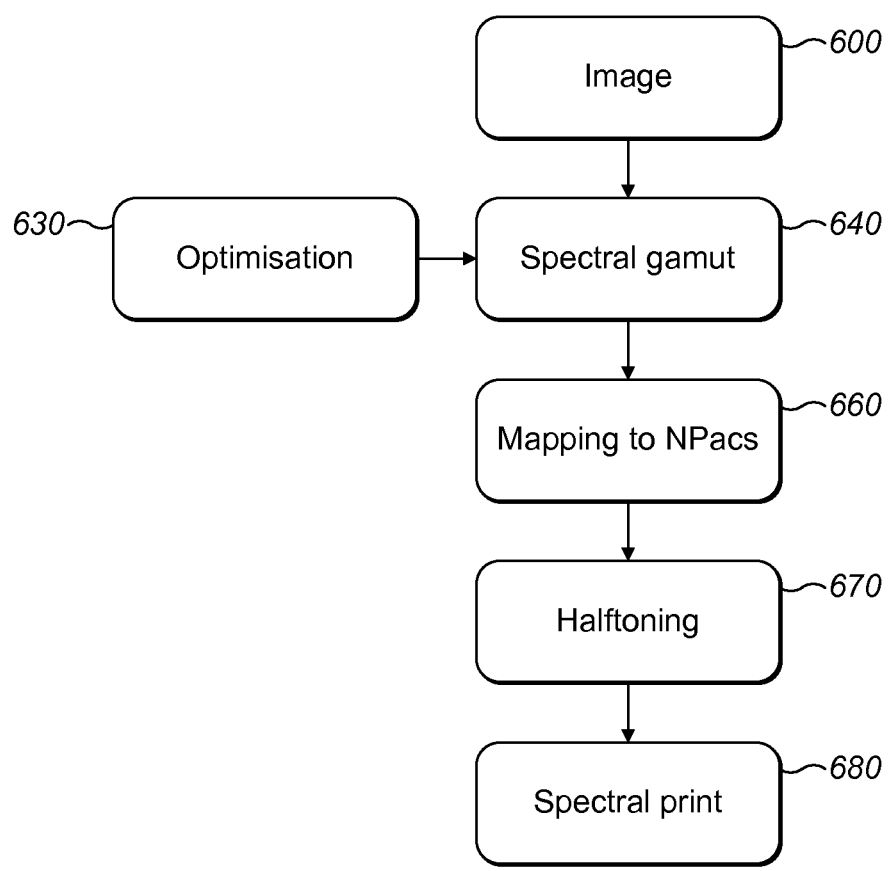
FIG. 6 is a flow chart that shows a method for spectral printing according to an example.

FIG. 6 shows a method for printing an image using a spectral print mapping. An image is selected at block 600. A spectral print mapping is obtained at block 640. For example, a spectral gamut may be generated according to the above examples, or a mapping derived from such a gamut, may be retrieved. In this example, the method includes performing optimization at block 630 for the spectral gamut. This may include compensating for reflectance properties of a printing medium (e.g. Yule-Nielsen effect) due to scattering effects within the paper or combinations of inks thereon. Performing optimization may also include one or more of optimizing color constancy, metamerism matching and/or taking the reflectance or spectral properties of the print medium into consideration to counteract unwanted effects such as optical dot gain in which the light scatter within the ink and print medium modifies the perceived color of a print reproduction. Other unwanted effects may arise due to variations in the printable inks as a function of the amounts of a primary ink printed, for example magenta on cyan may appear to have a different reflectance when compared to a cyan ink layer on magenta. For example, when ink is deposited on top of a substrate (e.g. paper), its effect may be different from when that same amount of ink interacts, in one or more of a physical and chemical sense, with another ink that is already on the substrate before it. At block 660 a mapping to NPacs is performed. At block 670 a halftoning operation is performed to use ink dots of various size and positions on the print medium to create the desired overall reflectance for an observer, by mapping the NPacs to single NPs that constitute the NPac at a halftone pixel. At block 680 a spectral print is output, e.g. by printing the mapped NPacs on a printing device. In some examples the optimization at block 630 may be based on pre-processing.

Figure 7:
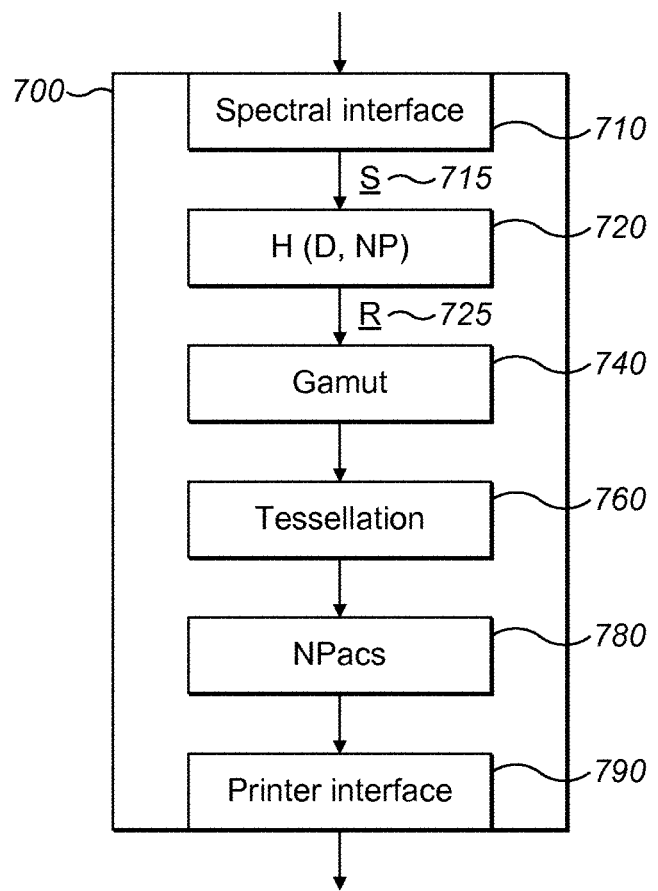
FIG. 7 is a schematic diagram showing a system for spectral printing according to an example.

FIG. 7 shows an example of a system 700 for spectral printing. This system may comprise, in one example print processor 120 of FIG. 1A. FIG. 7 shows a spectral interface 710 that obtains spectral characteristics 715 of the NP inks corresponding to the relevant printing device. This enables a determination of the spectral gamut available to the printing device. In addition, the spectral interface may collect image data of the selected image of the print, some material like textiles, plastics, or other, or original painting or other artwork, that is to be reproduced which may be optically scanned using a spectrometer as described above with reference to FIG. 2C. The measured reflectances from the original painting to be reproduced can then be fed into the image processing to better match a desired reflectance to a printable reflectance from the spectral gamut available. Alternatively, a conversion table may be used to map a printable reflectance directly to the image data of the original to be reproduced. The spectral characteristics 715 of the NPs are then converted to reflectance values 725 with a transfer function 720 dependent on parameters of the spectrometer, for example corresponding to the step size D in wavelength (d) or number of steps (N) taken to scan across a set range of wavelengths ($\lambda$). This is the simplest form of spectral separation on top of which optimization such as additional properties of reflectance or color constancy or metamerism can be performed amongst others.

Once the spectral characteristics 715 have been converted to reflectances 725 a spectral gamut 740 can be computed. The spectral gamut may be limited based on print characteristics for a printing device. Performing a tessellation 760 on the gamut 740 enables a convex hull to become addressable for selecting one or more of a printable reflectance. For a printable reflectance there can be a plurality of metamers matching the reflectance and based on a varying combination of the NPs. This plurality of reflectances corresponds to a plurality of tessellations as shown in FIG. 5B. The optimization step in this case involves looking through alternative tessellations (or other combinations of NPs that match the reflectance of a source color) to obtain samples matching the optimization criteria which may then be interpolated. There may also be metrics for optimization that do not directly depend upon the reflectance (such as metamerism or color constancy), for example to find the tessellation that gives a specific reflectance at minimum ink-usage. Using barycentric co-ordinates for chosen metamers directly maps the printable reflectance value to the area coverages needed to obtain that value of reflectance. The output from the tessellation of the spectral gamut therefore provides mapping to the NPacs 780 required to print the reflectance. The output from the tessellation is inputted to a printer interface 790. The printer interface communicates with a printing device. The printing device is configured to print a spectrally matched reproduction (e.g. a reproduction of an original painting).

Although FIG. 7 demonstrates one particular example of system for printing a spectral reflectance other methods may be used. For example, one system may be used to produce a gamut or mapping based on the gamut and another system may be used to produce the spectral print based on the output of the first system. In this latter example, a stored representation of a gamut may be used. This can be used instead of inputting the ink characteristics to generate a gamut as described with reference to FIG. 7.

A spectral workflow having one or more spectral variables as an input and an NPac as an output enables accurate reproduction of colors. For example, an input may be a hyper-/multi-spectral image or spectral data for spot-colors. Alternatively, the one or more spectral variables may themselves be generated based on other color data, for example generated as part of a pre-processing operation. A spectral workflow with a spectral input can consider additional constraints such as matching reflectances with preference to certain conditions. This may be done in both the colorimetric sense as well as additional constraints expressed in the spectral domain. Examples may be grain, color inconstancy or metamerism among others.

An example of a print system that uses NPs in image processing is a Halftone Area Neugebauer Separation (HANS) printing pipeline. HANS is an image processing system using NPs and NP area coverages (NPacs) and halftoning that may be optimized for minimum ink usage, grain or other print attributes. HANS changes the space in which a spectral separation process and a halftoning process communicate from the conventional ink space to the NPac space. The method and system may be used on a HANS printing pipeline with a dot-gain compensating modified spectral reflectance space that serves as the interface to the Neugebauer Primary area coverage domain that is the output of a typical HANS separation. A benefit of certain examples described herein is the ability to choose a metamer based on its reflectance value. This enables a color in a printed output produced using certain examples to appear the same under different light conditions.

Certain examples described herein may be used in security printing. By using spectral printing color constancy can be controlled. Since there may be more than one metamer or combinations of light that can be used to produce an equivalent perceived color, some parts of the reproduction may be printed with a metamer having one reflectance and other parts printed with a metamer having a second or other reflectance. In other words, some parts of the reproduction may be printed with a metamer having one spectral characteristic and other parts printed with a metamer having a second or other spectral characteristic. This allows various parts of the print reproduction to match under chosen illuminants but not match under other illuminants. In this way, a fake or counterfeit reproduction, or even an original painting, can be detected simply by observation under varying illumination conditions. The ability to print metamers in this way is available where a printing system is able to handle metamer redundancy based on reflectance/spectral characteristics. Another advantage of certain implementations of the described examples is an ability to access a spectral domain of a printing system. As color separations are defined in a spectral space, a range of a printing system may be increased.

Certain examples described herein may also be used in the field of fine art reproductions. Here it may be beneficial to give an observer an ability to see a painting reproduction in the same way as an original, and to spot colors such as PANTONEs® which provide a color guide for designers to color match.

Certain examples described herein use a modified spectral space, rather than a colorimetric space. This results in a spectrally-driven printing pipeline that expands upon the limited color sub-space obtainable with a colorimetric approach. This printing pipeline may be a HANS pipeline as described previously. A HANS printing system may use a Yule-Nielsen modified space that compensates for optical dot gain.

In certain examples linear spectral control may be used, and this may be applied in a modified YNN spectral reflectance space. In certain examples smooth transitions in reflectance space may be achieved by using linear weighted area coverages. Again these techniques may be adapted to use YNN-adapted spectral properties in a particular implementation.

In one variation a linear model basis may be used. For example, a look-up table (LUT) or other linear mapping may be used to generate output NPacs, wherein the mapping is generated based on a spectral gamut produced as described above. The input in this case may be one or more spectral values. Linear model basis weights may be generated based on the input spectral values and mapped to one or more output NPacs. In certain implementations, the linear model basis may be derived in a Yule-Nielsen modified spectral domain, for example instead of a standard derivation directly from a spectral reflectance.

In certain examples, using a liner basis model involves performing Principal Component Analysis or Characteristic Vector Analysis on the spectra of the printable reflectances using the printing system, which results in vectors in reflectance space along which the printable reflectances vary most. These methods of multivariate analysis are used broadly for dimensionality reduction where over 99% of a dataset's variation is typically expressed by 6-10 bases. Instead of a reflectance being represented by 16 or 31 values, each for one 10 nm or 20 nm wide wavelength interval, it can instead be expressed by 6-10 weights determining how each of the 6-10 corresponding linear bases are to be scaled before their summation. For example, in these cases, instead of a 16 (400 to 700 nm at 20 nm steps) or 31 (400 to 700 at 10 nm steps) dimensional LUT operation, a 6 or 10 dimensional LUT operation could be used. In these cases the dimensionality of the mapping is reduced by using a linear model basis. In these cases, input reflectances may be mapped to the Yule-Nielsen spectral domain; the mapped reflectances may then be further mapped to an M-dimensional Yule-Nielsen spectral linear model basis; and the linear model weights in this domain may then be used to interpolate and weight LUT nodes to determine one or more NPacs values.

In another variation a workflow may output spectral reflectance based on additional priors, i.e. other known parameters. These parameters may indicate, and as such distinguish between natural scenes or spot-color graphics. This may enable reflectances from within a metamer set to be optimized to avoid color inconstancy.

While certain Figures have been described herein, it is to be understood that the methods described herein may be performed without any explicit visualization. For example, a convex hull may be determined using a mathematical operation without plotting points in multi-dimensional space.

At least some aspects of the examples described herein with reference to the drawings may be implemented using computer processes operating in processing systems or processors. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes described herein. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Similarly, it will be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least a data processor or processors as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer-implemented method for operating a printing device comprising:
    obtaining spectral characteristics for at least a plurality of printing fluids;
    determining reflectance values for Neugebauer Primaries based on the obtained spectral characteristics;
    computing a gamut in spectral space using the determined reflectance values, said gamut being modified according to print characteristics for the printing device;
    performing a tessellation of the gamut in the spectral space to determine barycentric coordinates, the barycentric coordinates representing a set of Neugebauer Primary area coverages for the printing device; and
    printing, by the printing device, an image using the Neugebauer Primary area coverages.

2. The method of claim 1, wherein the spectral characteristics are obtained for a particular substrate of a print medium.

3. The method of claim 1, further comprising applying at least one spectral Yule-Nielsen factor to obtain said spectral characteristics.

4. The method of claim 1, wherein said print characteristics comprise printing fluid limits of the printing device.

5. The method of claim 1, wherein computing the gamut is performed in a spectral domain by means of minimum-distance mapping or distance co-minimization.

6. The method of claim 1, further comprising performing an optimization of the gamut, the optimization comprising applying one or more optimization criteria.

7. The method of claim 1 wherein the gamut represents printable spectral separations in a halftone print system.

8. The method of claim 1, wherein a point in said spectral space comprises an N-dimensional representation of at least one spectrum.

9. The method of claim 1, comprising:
receiving a reflectance value;
mapping the reflectance value to the Neugebauer Primary area coverages for the printing device using said gamut and
mapping the Neugebauer Primary area coverages to a corresponding Neugebauer Primary for a halftone pixel,
wherein printing, by the printing device, the image using the Neugebauer Primary area coverages comprises:
producing a printed output based on the halftone pixel.

10. A computer-implemented method for operating a printing device comprising:
selecting a target reflectance to be printed;
retrieving a spectral print mapping;
locating a tessella containing the target reflectance in a spectral separation space defined by the spectral print mapping;
computing barycentric coordinates of the target reflectance within the tessella to output Neugebauer Primary area coverages for the target reflectance to be printed, and
printing, by the printing device, an image using the Neugebauer Primary area coverages.

11. The method of claim 10, wherein the target reflectance is converted into a Yule-Nielson modified spectral domain corresponding to the spectral print mapping.

12. The method of claim 10, wherein the spectral print mapping is generated by:
obtaining spectral characteristics for at least a plurality of printing fluids;
determining reflectance values for Neugebauer Primaries based on the obtained spectral characteristics; and
computing a gamut in spectral space using the determined reflectance values, said gamut being modified according to print characteristics for the printing device.

13. A printing device comprising:
a print processor arranged to receive at least one reflectance value indicative of an image to be printed and to map the at least one reflectance value to one or more Neugebauer Primary area coverages by performing a tessellation of a gamut in spectral space to determine barycentric coordinates representing the Neugebauer Primary area coverages; and
a hardware printing mechanism to print output corresponding to the image using the one or more Neugebauer Primary area coverages.

* * * * *

UNITED STATES PATENT AND TRADEMARK OFFICE
CERTIFICATE OF CORRECTION

PATENT NO. : 9,626,607 B2  Page 1 of 1
APPLICATION NO. : 14/780772
DATED : April 18, 2017
INVENTOR(S) : Peter Morovic et al.

It is certified that error appears in the above-identified patent and that said Letters Patent is hereby corrected as shown below:

In Column 15, Line 29, in Claim 10, delete "printed, and" and insert -- printed; and --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*